(12) United States Patent  (10) Patent No.: US 7,055,560 B1
Sexton                     (45) Date of Patent:     Jun. 6, 2006

(54) COVER FOR CAPLESS FILLER TUBE

(75) Inventor: Ronald E. Sexton, South Lyon, MI (US)

(73) Assignee: Gaton Corporation, Cleveland, OH (US)

( * ) Notice: Subject to any disclaimer, the term of this patent is extended or adjusted under 35 U.S.C. 154(b) by 0 days.

(21) Appl. No.: 11/108,253

(22) Filed: Apr. 18, 2005

(51) Int. Cl.
    B65B 1/04 (2006.01)
(52) U.S. Cl. ............... 141/350; 220/86.2; 220/DIG. 33
(58) Field of Classification Search ................ 141/349, 141/350; 220/86.2, DIG. 33
    See application file for complete search history.

(56) References Cited

U.S. PATENT DOCUMENTS 4,702,386 A * 10/1987 Boehmer et al. .......... 220/86.2
6,009,920 A    1/2000 Palvoelgyi
6,092,685 A    7/2000 Gruber
6,155,316 A   12/2000 Benjey
6,789,586 B1 * 9/2004 Levey ..................... 141/350

* cited by examiner

Primary Examiner—Steven O. Douglas
(74) Attorney, Agent, or Firm—Anna M. Shih

(57) ABSTRACT

A protective cover for a filler tube for a fuel tank includes a body portion and a movable door that covers and exposes an opening in the filler tube. To guide the movement of the nozzle, the cover includes a nozzle guide that contacts the nozzle and acts as a fulcrum with a radius of rotation. When force is applied to the nozzle, the nozzle guide amplifies the force and causes the nozzle to act as a lever against the feature on a sliding door, allowing the door to slide open with minimal force from the user.

12 Claims, 7 Drawing Sheets

COVER FOR CAPLESS FILLER TUBE

TECHNICAL FIELD

The present invention relates to filler tube closures, and more particularly to a protective cover for a closure in a fuel tank.

BACKGROUND OF THE INVENTION

Vehicle emissions standards have become increasingly stringent due to knowledge of the negative environmental effects of hydrocarbon emissions, which are generated by fuel vapors released into the atmosphere. For vehicles and other fuel-operated devices, controlling and containing fuel vapors is important to reduce emissions. Vehicles contain an on-board diagnostic system that monitors whether the fuel system is completely vapor-tight.

The refueling process requires a user to remove a closure, such as a gas cap, which seals a filler tube in the fuel system when the gas cap is screwed over or onto the filler tube. Screwing and unscrewing the gas cap requires the user to undergo several different steps and motions during the refueling process that must either be conducted with two hands or as separate steps (i.e., it is difficult to unscrew a gas cap and hold a refueling nozzle using the same hand at the same time). Currently known structures attempting to solve this problem tend to require the user to apply a high amount of force on the door to open it, making it inconvenient to use.

There is a desire for a structure that can protect an opening in a filler tube from environmental contaminants while allowing the structure to be easily manipulated by the fuel nozzle alone and with relatively low force.

SUMMARY OF THE INVENTION

The present invention is directed to a protective cover for a filler tube. The cover includes a body portion and a movable door that covers and exposes an opening in the filler tube. The door includes a feature that protrudes from the plane of the door so that the door can be easily moved to an open position by pressing a tip of a fuel nozzle against the door and sliding the tip. To guide the movement of the nozzle, the cover also includes a nozzle guide that captures the tip of the nozzle and acts as a fulcrum with a radius of rotation. When force is applied to the nozzle, the nozzle guide amplifies the force and causes the nozzle to act as a lever against the feature on the sliding door, allowing the door to slide open without requiring excessive force.

The inventive cover may be used in conjunction with a capless filler tube having a flapper that is pulled shut by a latch structure to form a vapor-tight seal.

DETAILED DESCRIPTION OF THE EMBODIMENTS

Figure 1:
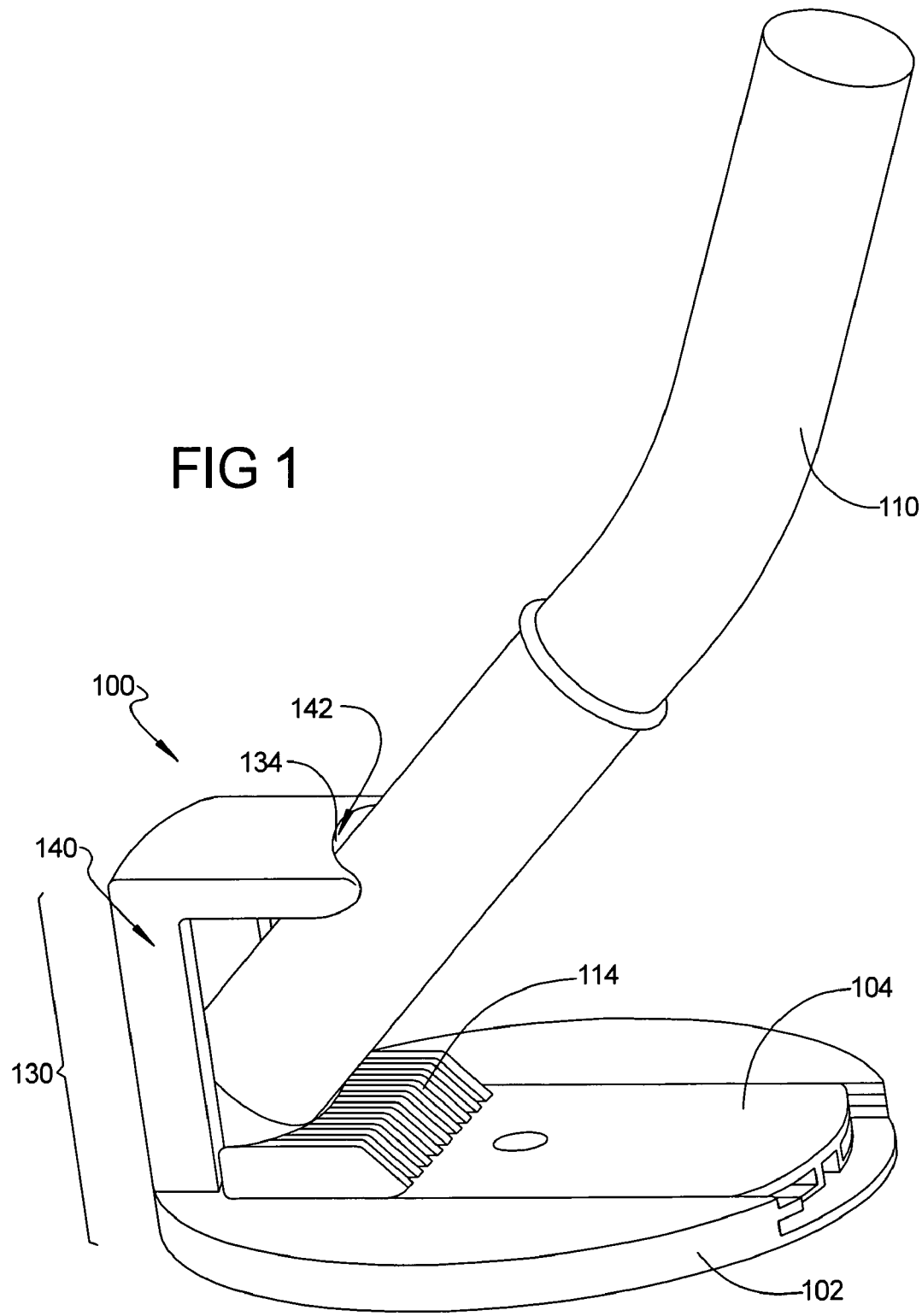
FIG. 1 is a perspective view of a protective cover for a filler tube according to one embodiment of the invention.

For all of the embodiments shown in FIGS. 1 through 6, the cover 100 comprises a body portion 102 and a movable protective door 104. The cover 100 is preferably made of any material that is durable enough to resist deterioration in harsh environmental conditions over an extended time period, such as plastic. In the illustrated embodiment, the door 104 is slidable along the body portion 102 to either expose or cover an opening 108 that can accommodate a fuel nozzle 110. The opening 108 is aligned with an opening in the filler tube (not shown).

The door 104 is retained in the body portion 104 as the door 104 is moved in the direction shown by arrow A so that the door 104 remains attached to the body portion 102 as it slides. A resilient member (not shown) may be used to bias the door 104 toward a closed position, if desired.

The door 104 has a feature 114 that acts as a support for the tip of the fuel nozzle when the fuel nozzle is used to move the door 114. The feature 114 can have any configuration that allows the door 104 to be easily opened simply by applying pressure to the feature 114.

To open the door 104 in all of the embodiments, a user may apply downward pressure on the feature 114 using the tip of the fuel nozzle 110 to slide the door 104 to an open position and expose the opening 108, providing access to the filler tube. As the door 104 is opened, the retainer 112 moves along the slot 110. As long as the fuel nozzle is inside the opening 108, the door 104 will remain held open. If the door 104 is resiliently biased toward the closed position, removing the fuel nozzle from the opening 108 will cause the door 104 to close automatically and cover the opening 108.

To reduce the amount of force needed to open the door 104 using the fuel nozzle 110, the invention incorporates a guide member 130 that guides the fuel nozzle 110 to act like a lever and increase the amount of force against the feature 114 that is applied by the tip of the fuel nozzle 110. When the fuel nozzle is inserted into the guide member 130, the guide member 130 directs the fuel nozzle 110 so that the tip of the fuel nozzle 110 rests near or against the feature 114. When the nozzle 110 is pivoted with the assistance of the guide member 130, a contact point 134 between the nozzle 110 and the guide member 130 acts a fulcrum with the rest of the nozzle 110 acting like a lever. The contact point 134 acts as a pivot point for the movement of the nozzle 110. The tip of the nozzle 110 will therefore rotate about the contact point 134 at a radius X, causing the tip to push the door 104 open. Any force on the nozzle 110 will therefore be amplified at the tip. As a result, a user only needs to rotate the fuel nozzle 110 slightly, with little force, to open the door 104.

Figure 2:
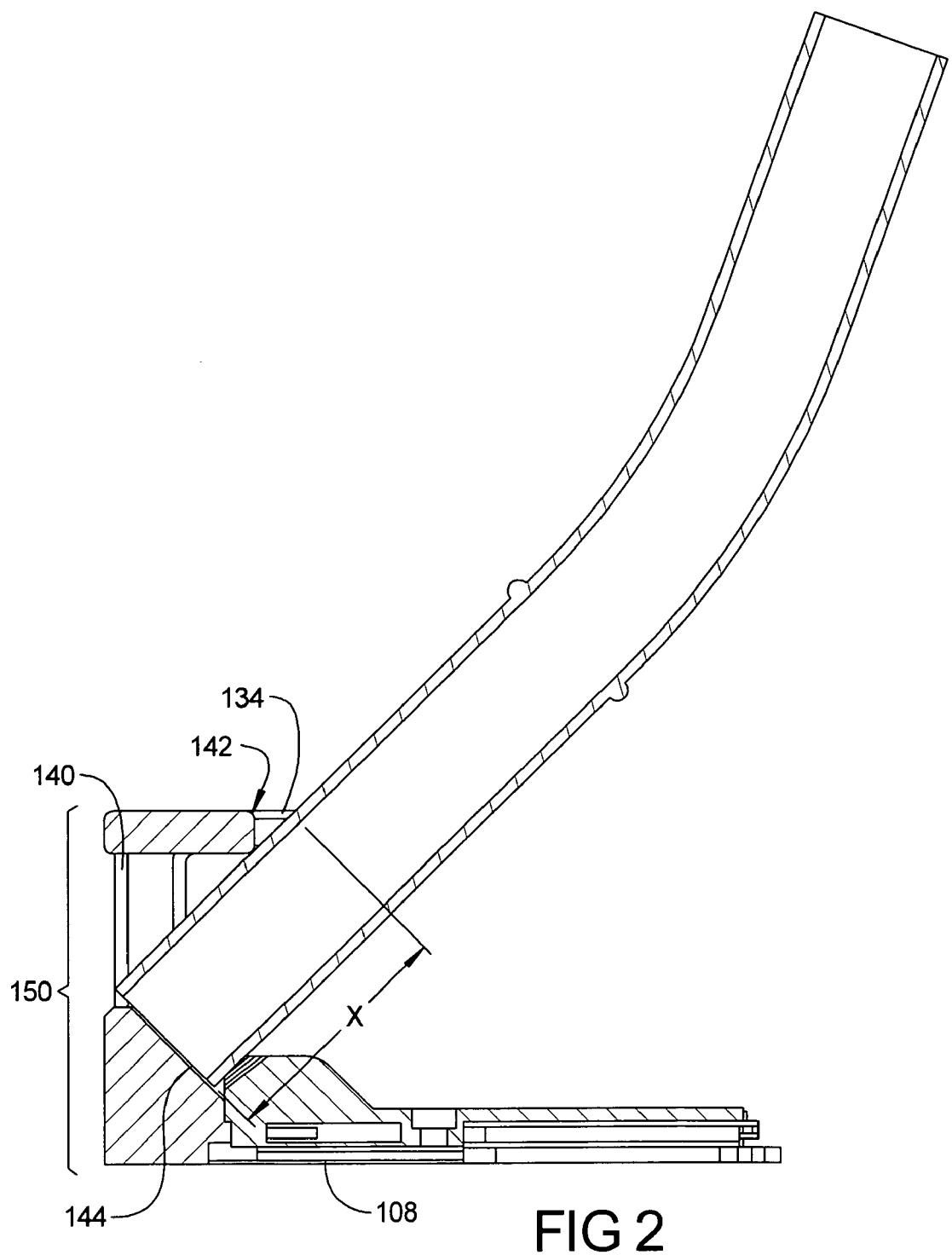
FIG. 2 is a plan section view of the protective cover shown in FIG. 1.

FIGS. 1 and 2 illustrate one possible configuration for the guide member 130. In this embodiment, the guide member 130 is a bracket 140 that extends out from the plane of the body portion 102 of the cover 100. The bracket 140 includes a curved recess 142 that cradles the side of the fuel nozzle 110. The contact point 134 in this embodiment is the area where the nozzle 110 contacts the curved recess 142. The curved recess 142 guides the position of the nozzle 110 while still allowing the nozzle 110 to be rotated about the contact point 134 to push the features 114, and therefore the door 104, open.

In one embodiment, the bracket 140 is integrally formed with the body portion 102 and extends substantially perpendicularly outward from the plane of the body portion 102. Also, to provide additional guidance over the movement of the nozzle 110, a ramp 144 may be formed in the body portion 102 so that the tip of the nozzle 110 can be guided down the ramp 144 toward the door 104 as it rotates about radius X.

Figure 3:
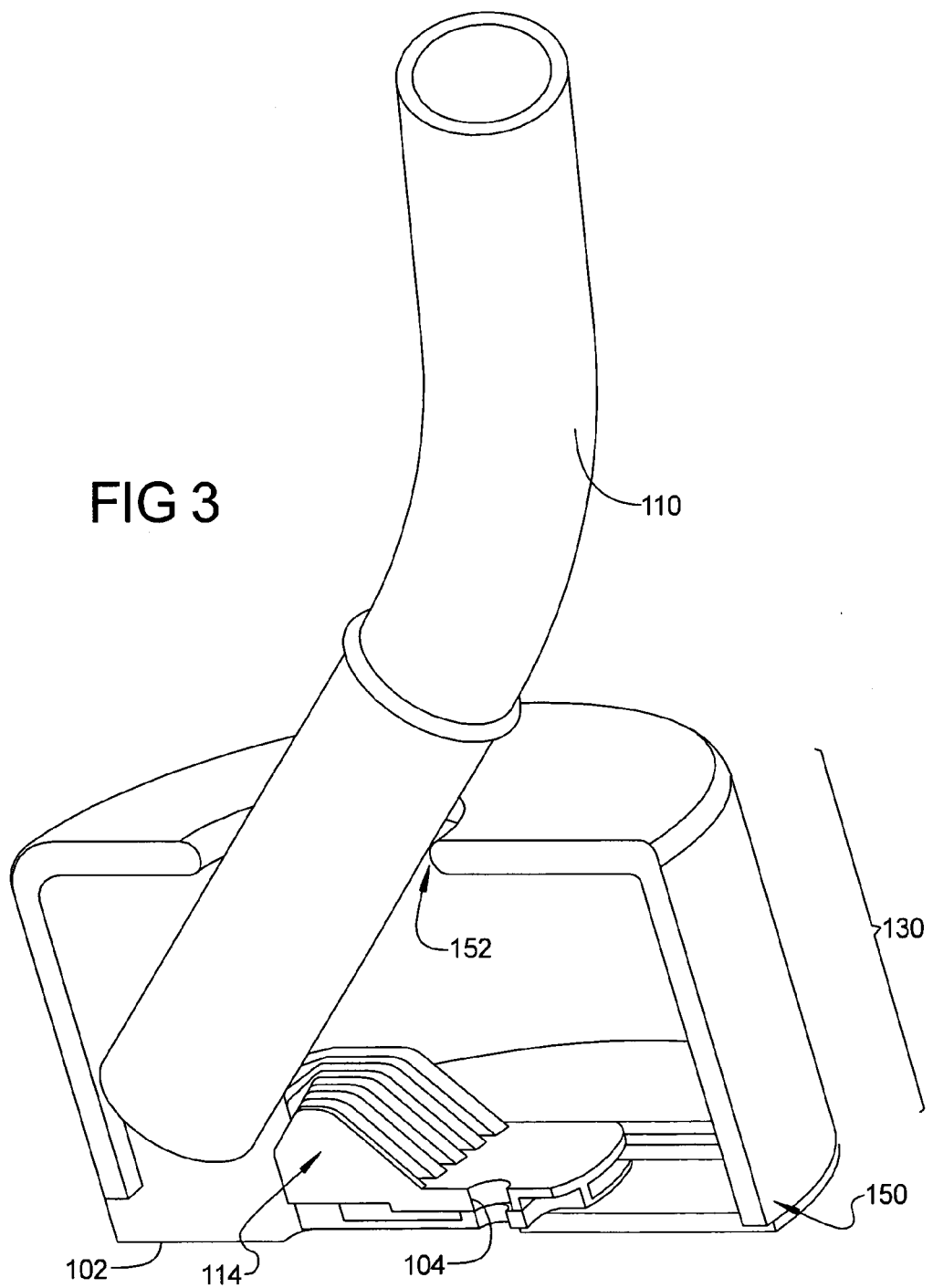
FIG. 3 is a perspective view of a protective cover for a filler tube according to another embodiment of the invention.
Figure 4:
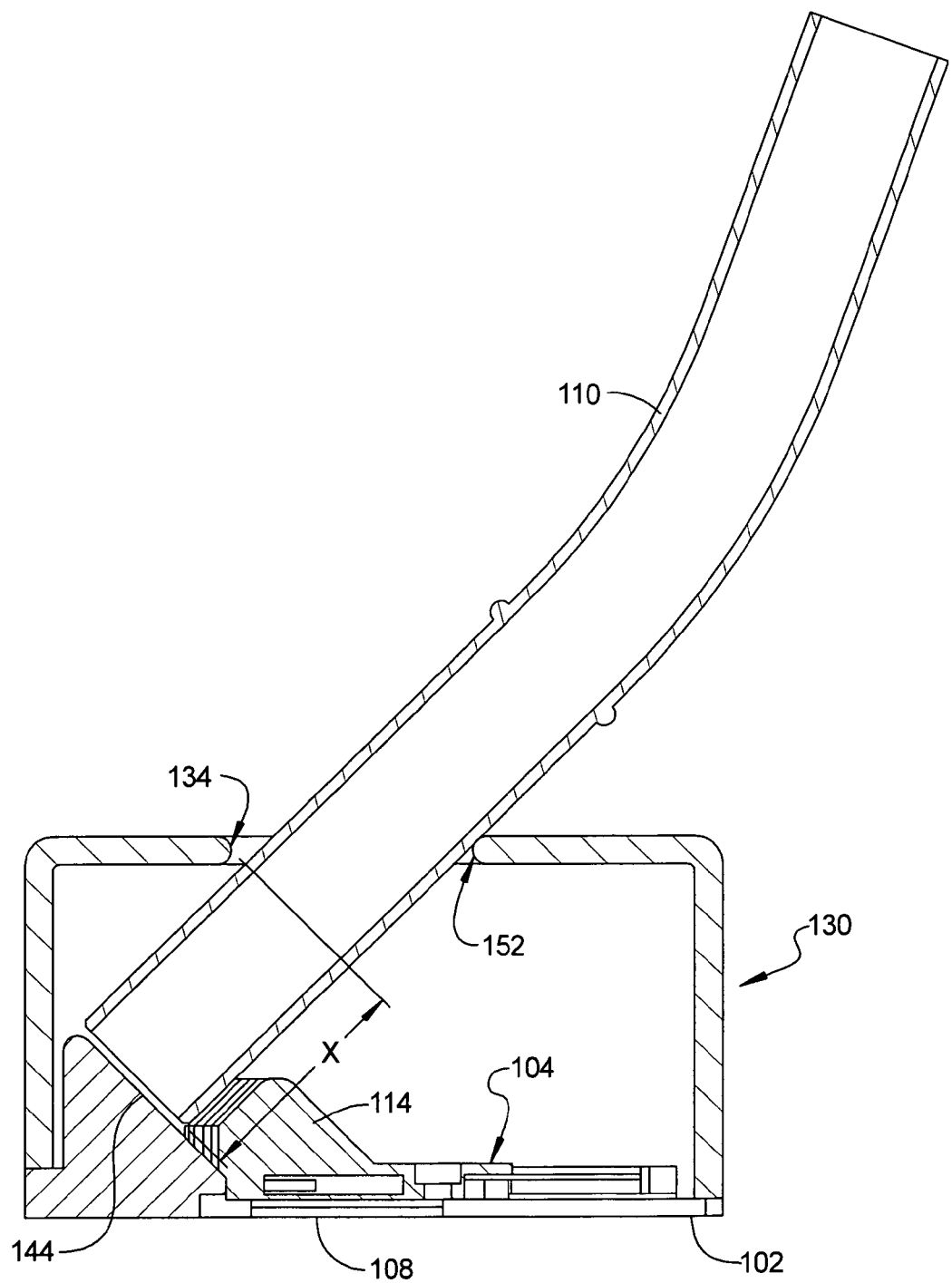
FIG. 4 is a plan section view of the protective cover shown in FIG. 3.

FIGS. 3 and 4 illustrate another embodiment for the guide member 130. In this embodiment, the guide member 130 is a housing 150 that shields the body portion 102 and the door 104. The housing 145 includes an opening 152 that can accommodate the fuel nozzle 110. Like the door 104, the housing 150 is preferably made of a durable, weather and corrosion-resistant material. In one embodiment, the housing 150 is formed as a separate piece that is attached to the body portion 102 via any appropriate manner, such as welding or adhesive means. When the fuel nozzle 110 is inserted into the opening 152, the contact point 134 at which the nozzle 110 contacts the housing 150 acts as a fulcrum like the embodiment described above. Like the embodiment described above, this embodiment may also include a ramp 144 in the cover 100 (e.g., on the body portion 102).

Both of the embodiments of the guide member 130 described above are relatively simple structures that act as passive guides for the fuel nozzle 110. As can be seen in FIGS. 1 through 4, the guide member 130 provides a structure against which the nozzle 110 can rest to form the contact point 134 so that the nozzle 110 can act as a lever when it is rotated by the user. The ramp 144 also provides another structure that guides the nozzle 110 toward the door 104.

Figure 5:
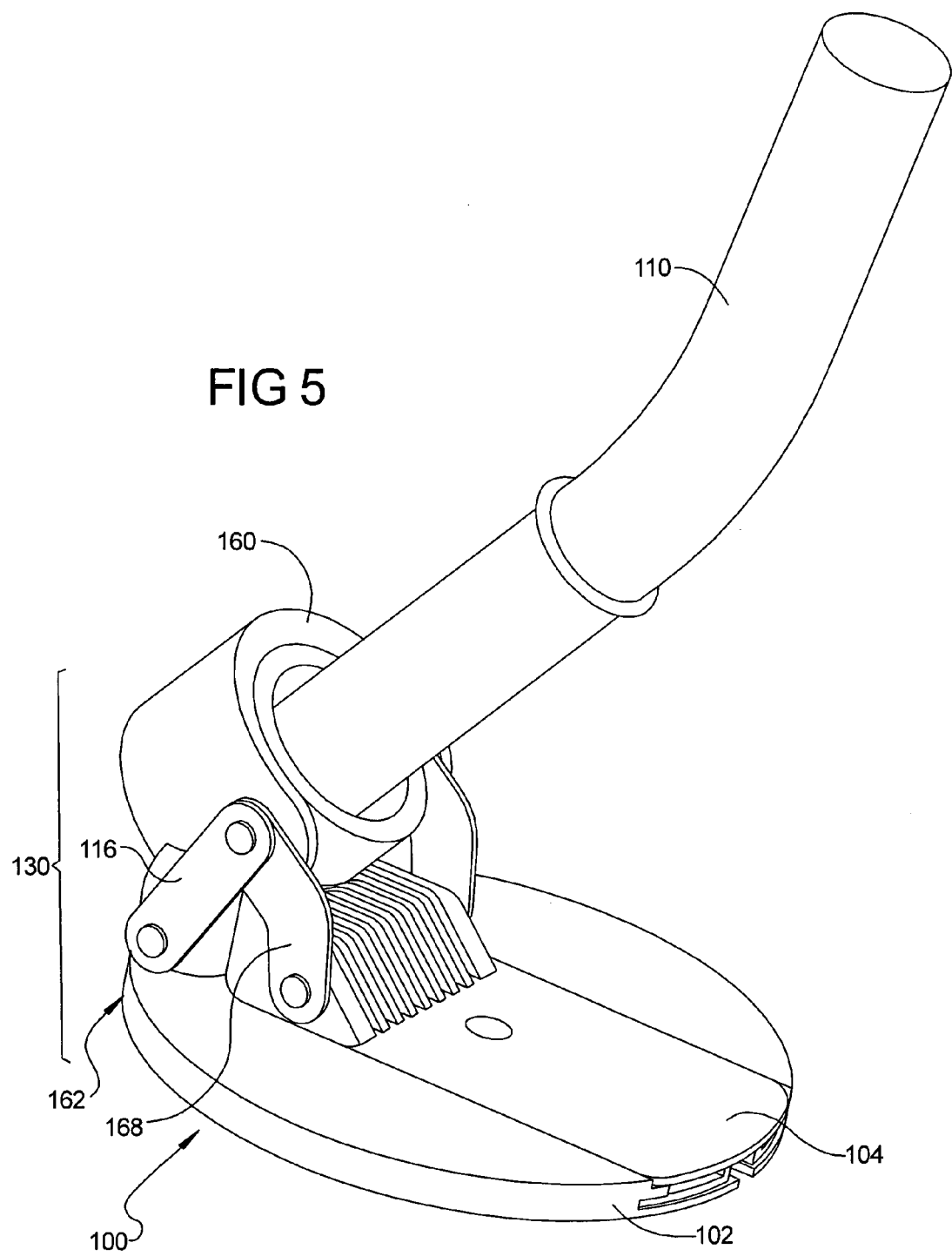
FIG. 5 is a perspective view of a protective cover for a filler tube according to yet another embodiment of the invention, where the protective cover is in a first position.
Figure 6:
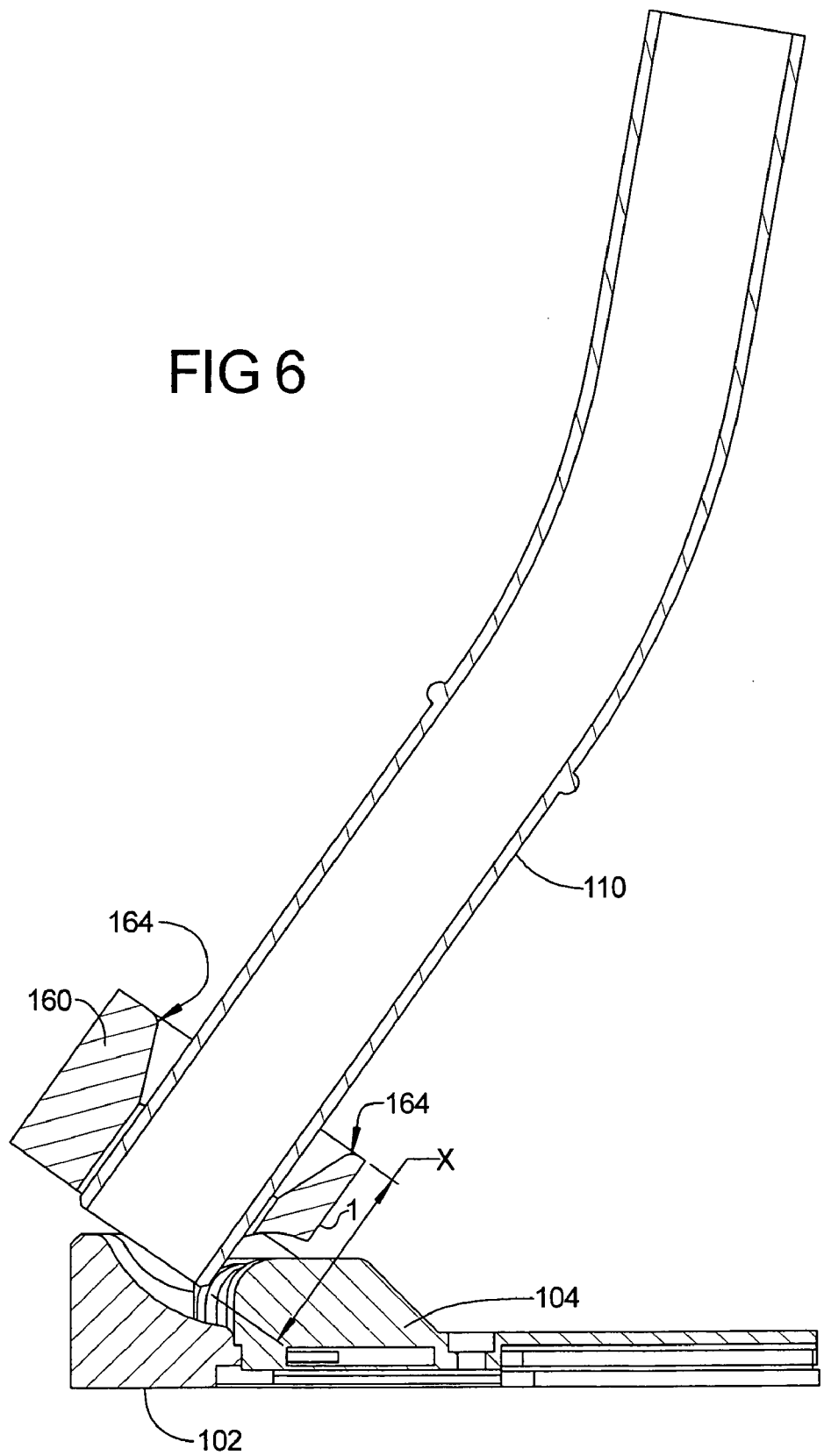
FIG. 6 is a plan section view of the protective cover shown in FIG. 5.
Figure 7:
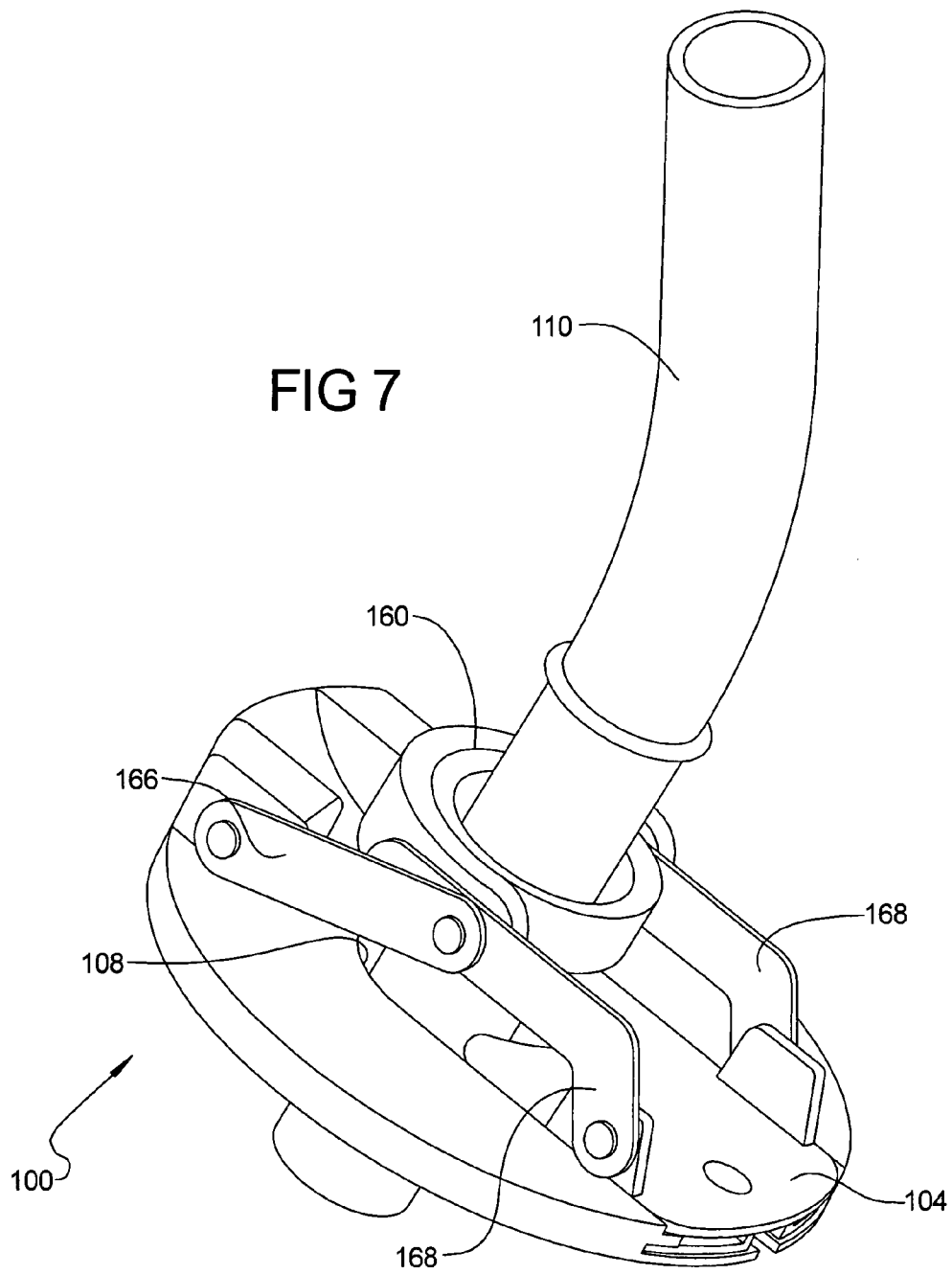
FIG. 7 is side view of the protective cover shown in FIG. 5 in a second position.

FIGS. 5 through 7 illustrate a guide member 130 that provides more direct control over the movement of the nozzle 110. In this embodiment, the ramp may be omitted from the body portion 102 of the cover 100, if desired. The guide member 130 in FIGS. 5 and 6 includes a ring 160 that fits around the tip of the nozzle 110. An interior surface 162 of the ring 160 has a flared surface 164 that does not contact the nozzle 110 when it is first inserted into the ring 160. The ring 160 is supported by a hinge mechanism 162 that includes a straight arm 166 and a bent arm 168 disposed on either side of the door 104 and pivotably connected to each other.

In one embodiment, the ends of the bent part 166 are attached to the door 104 and the ring 160, and the ends of the straight arm 166 are attached to the body portion 102 and the ring 160. As shown in the figures, this configuration causes the ring to rotate from an angled position that easily accommodates the nozzle 110 when it is first inserted while the door 104 is closed (FIG. 5) to a position generally parallel to the plane of the body portion 100 so that the tip of the nozzle 110 is in the correct orientation to be inserted through the opening 108 (FIG. 7).

When the nozzle 110 is first inserted into the ring 160, as shown in FIGS. 5 and 6, the tip of the nozzle 110 rests against the feature 114. Upward rotational movement of the nozzle 110 causes the nozzle 110 to contact the flared surface 164 inside the ring 160, which acts as the contact point 134 fulcrum for the pivoting movement of the nozzle 110. The straight arm 166 and the bent arm 168 move about their pivot points to rotate the ring 160 and guide the nozzle 110 so that it moves downward against the feature 114 on the door 104 to open the door 104, as shown in FIG. 7. More particularly, the ring 160 pivots from its initial angled position to a position substantially parallel to the plane of the body portion 102 to place the nozzle 110 in the correct orientation for sliding through the opening 108. Removing the nozzle 110 from the filler tube moves the ring 160 back to the initial position shown in FIGS. 5 and 6.

By incorporating a protective cover having a door that is movable to cover and reveal a filler tube, the inventive filler tube cover protects the filler tube opening and any associated closures (e.g. a flapper door) from being contaminated or damaged by environmental factors. Moreover, the guide member provides a fulcrum so that the fuel nozzle acts like a lever when opening the door, reducing the amount of force that needs to be applied by the user to open the door.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cover for a filler tube in a fuel system, comprising:
   a body portion having an opening that corresponds to an opening in the filler tube;
   a door coupled to the body portion, wherein the door is movable between an open position that exposes the opening in the body portion and a closed position that covers the opening in the body portion;
   a feature that protrudes from the door to contact a tip of a fuel nozzle; and
   a guide member that contacts the fuel nozzle to form a contact point, wherein the contact point acts as a fulcrum about which the tip of the nozzle rotates about a radius to open the door.

2. The cover of claim 1, wherein at least one of the body portion, the door, the feature, and the guide member are made of plastic.

3. The cover of claim 1, wherein the guide member comprises a bracket having a recess that cradles the fuel nozzle to form the contact point.

4. The cover of claim 3, wherein the bracket is integral with the body portion.

5. The cover of claim 3, wherein the bracket extends outwardly from a plane of the body portion.

6. The cover of claim 1, wherein the guide member comprises a housing disposed over the body portion, the door, and the feature, the housing having an opening that accommodates the fuel nozzle, the opening having a surface acting as the contact point.

7. The cover of claim 6, wherein the housing is an independent piece that is attached to the body portion.

8. The cover of claim 1, wherein the guide member comprises:
   a ring that accommodates the tip of the fuel nozzle, the ring having an interior surface with a portion acting as the contact point; and
   a hinge mechanism attached between the ring and at least one of the door and the body portion that allows the tip of the fuel nozzle about the radius.

9. The cover of claim 8, wherein the hinge mechanism comprises:
   a first arm with a first end pivotably connected to the ring and a second end pivotably connected to the body portion; and a second arm with a first end pivotably connected to the ring and a second end pivotably connected to the door.

10. The cover of claim 9, wherein the first arm is straight and the second arm is bent, and wherein the first end of the first arm and the first end of the second arm are connected to the ring at a common pivot point.

11. The cover of claim 8, wherein the hinge mechanism rotates the ring between an angled position when the door is in the closed position to a position generally parallel to a plane of the body portion when the door is in the open position.

12. The cover of claim 1, wherein the body portion further comprises a ramp that directs a tip of the fuel nozzle toward the feature when the fuel nozzle.

\* \* \* \* \*

UNITED STATES PATENT AND TRADEMARK OFFICE
CERTIFICATE OF CORRECTION

PATENT NO. : 7,055,560 B1 Page 1 of 1
APPLICATION NO. : 11/108253
DATED : June 6, 2006
INVENTOR(S) : Ronald E. Sexton It is certified that error appears in the above-identified patent and that said Letters Patent is hereby corrected as shown below:

On The Title Page (73), delete "Gaton" and replace with -- Eaton --.

Signed and Sealed this

Twenty-fifth Day of December, 2007

JON W. DUDAS
*Director of the United States Patent and Trademark Office*